United States Patent [19]

Bacconnier

[11] Patent Number: 5,253,388
[45] Date of Patent: Oct. 19, 1993

[54] WINDSHIELD WIPER SYSTEM WITH REMOTELY ADJUSTABLE CONTACT FORCE

[76] Inventor: Raymond Bacconnier, 6, rue Colbert, Bourg Les Valence, France, 26500

[21] Appl. No.: 836,271
[22] PCT Filed: Aug. 23, 1990
[86] PCT No.: PCT/FR90/00624
 § 371 Date: Feb. 28, 1992
 § 102(e) Date: Feb. 28, 1992
[87] PCT Pub. No.: WO91/03394
 PCT Pub. Date: Mar. 21, 1991

[30] Foreign Application Priority Data

Aug. 28, 1989 [FR] France .................................. 8911469

[51] Int. Cl.⁵ .................................................... B60S 1/32
[52] U.S. Cl. ............................... 15/250.20; 15/250.35
[58] Field of Search ............ 15/250.20, 250.34, 250.35, 15/250.19, 250.21, 250.23

[56] References Cited

U.S. PATENT DOCUMENTS

| 4,472,854 | 9/1984 | Baver et al. ................. | 15/250.20 |
| 4,736,484 | 4/1988 | Baver et al. ................. | 15/250.20 |

FOREIGN PATENT DOCUMENTS

| 3444927 | 7/1986 | Fed. Rep. of Germany . | |
| 2507554 | 6/1982 | France . | |
| 0097451 | 4/1988 | Japan ........................... | 15/250.20 |
| 853475 | 11/1960 | United Kingdom ........... | 15/250.35 |

Primary Examiner—Harvey C. Hornsby
Assistant Examiner—Gary K. Graham
Attorney, Agent, or Firm—Bacon & Thomas

[57] ABSTRACT

A windshield wiper system includes a wiper arm supporting a wiper pivotally attached to a lever member through a toggle joint, with the lever member being pivotally connected to a connection block and the wiper arm being attached to the connection block through a spring assembly which applies a force biasing the wiper into contact with a surface to be wiped. An adjusting cable extends between the lever member and the connection block to control the contact force.

9 Claims, 5 Drawing Sheets

FIG._1

FIG_2

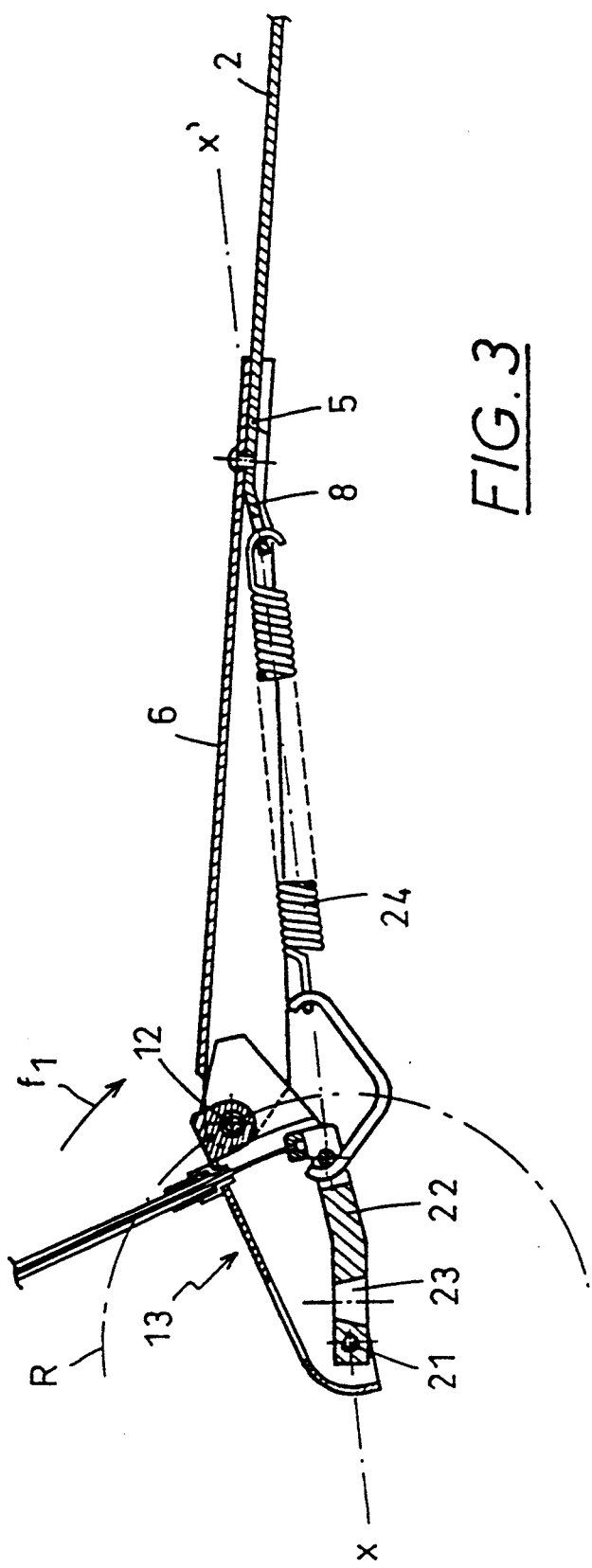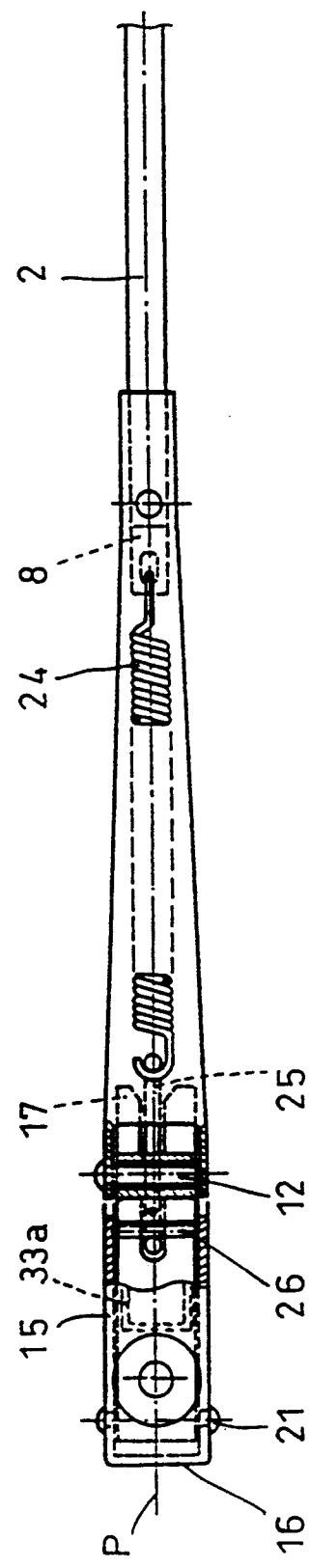
FIG. 3
FIG. 4

WINDSHIELD WIPER SYSTEM WITH REMOTELY ADJUSTABLE CONTACT FORCE

BACKGROUND OF THE INVENTION

The present invention relates to windshield wiper systems ensuring evacuation of the streams of water flowing over the windows or windscreens of vehicles, as well as cleaning of the surface through which one looks.

The windshield wiper systems are mounted on different types of vehicles and, in particular, on automobile vehicles of the car, lorry, coach type.

The present invention is applicable not only to the types of vehicles mentioned hereinabove, but also to any structure, mobile or not, presenting a windscreen of which at least a portion of the surface is covered by a wiper, such as boats or trains for example.

PRIOR ART

Conventional windshield wiper systems generally comprise a wiper arm on which is mounted a wiper and a support block connected, by one end, to the arm of the wiper and, by another end, to a driving member whose function is to give a reciprocating movement to the windshield wiper system assembly.

The wiper is maintained in contact against the surface to be wiped by means of a spring creating a return force applying the wiper against the surface to be wiped. The spring is generally mounted, by one end, on the wiper arm and, by its other end, on the support block.

The prior art windshield wiper systems employing this principle may be considered as satisfactorily performing the functions of wiping when the conditions of use do not involve a high speed of the vehicle on which the system is mounted, or when the general atmospheric conditions do not include high amplitudes of movement, wind and flowrate of water.

In fact, it has been observed that, in the case of a high speed of the vehicle, the windshield wiper arms were subjected to a force causing a detachment of the wiper with respect to the surface to be wiped, such force being all the greater as the speed of the vehicle is high. Such detachment is also all the more accentuated as the length of the wiper arm increases and as the flowrate of water grows. The generally convex shape of automobile windscreens also contributes to promoting detachment of the wiper arms. This phenomenon obviously reduces the efficiency of wiping effected by the wiper arms.

The problem thus identified is all the greater as the average speed of automobile vehicles tends to increase constantly and the use of windshield wiper systems employing one wiper arm is becoming general, whilst the search for greater driving safety in all weathers remains an essential preoccupation of professionals.

It has already been proposed to employ deflectors mounted on the wiper arm or wiper. Such deflectors have an aerodynamic shape especially designed to be able to create, by bearing with the relative wind created by the displacement of the vehicle in the air, an additional return force contributing to cancelling or reducing the force of detachment of the wipers. However, this solution remains of limited use, due to the necessarily reduced surface of the deflectors, since they must not reduce the field of vision of the driver. The effect of the additional contact force therefore remains limited. In addition, the inaesthetic appearance of such devices and their effect of drag should be taken into account.

The solution proposed by French Patent Application FR-A-2 516 461 is also known, which consists in mounting on the driving shaft of the wiper arm a tight chamber in which is mounted a piston sliding in a cylinder. The piston and the cylinder constitute a hydraulic assembly supplied by a fluid, the piston being applied, via a telescopic lever, on the arm of the wiper. This latter is, furthermore, conventionally subjected to a return force against the windscreen via a spring. Thanks to the thrust of the piston on the lever, this device thus makes it possible to furnish an additional return force of the arm towards the windscreen. The solution recommended necessitates the use of an additional energy supply, namely hydraulic energy, rendering the use of such a solution incompatible with the search for production costs which are as low as possible.

Furthermore, the use of a hydraulic system, due to the risks of circuit breakdown and leakage which are run, is not an appropriate solution in the case of vehicles intended to be used by the general public and for which the search for reliability and safety is a constant imperative. The solution proposed also suffers from a relative fragility associated with the risks of twist and blockage likely to occur at the level of the telescopic lever.

Another proposition is also known, described in French Patent Application FR-A-2 427 226. The solution recommended consists in furnishing an additional return force of the wiper arm towards the windscreen, the wiper arm being conventionally subjected to a constant return force resulting from a spring fixed, by one end, on the wiper arm and, by another end, on a rod for maintaining in relation with the support block of the windshield wiper system.

The maintaining rod is fast with a lever, pivoting on the fixation block about an axis, and disposed in a space made between the two arms of the support block. The end of the lever opposite the axis of pivoting, is constituted by a bent element mechanically connected to a rod longitudinally mobile in a bore made in the driving shaft of the wiper. An electric motor or an electro-magnet controls the reciprocating displacement of the mobile rod in the bore. Such displacement, thanks to the mechanical link, ensures pivoting of the lever about its axis of rotation, the lever then being able to take two stable positions respectively located on either side of a plane passing through the axis of pivoting of the lever and the fixation end of the spring on the wiper arm. The upper stable position of the lever corresponds to a maximum extension of the mobile rod and to a so-called normal return force of the wiper against the windscreen. The passage from the upper stable position towards the lower position of the lever corresponds to an increase in the return force exerted by the spring, since the lower position corresponds to an elongation of the return spring and to an angular modification of its position with respect to the wiper arm.

Although it may be considered that this device brings a solution to the problem of detachment of the wiper arms in the case of high speed of the vehicle, it remains complex and delicate to implement.

In fact, it is necessary to provide a particular arrangement of the conventional windshield wiper devices, since the drive shafts must be modified and additional devices for controlling the mobile rod must be provided.

Furthermore, this device proves fragile from the mechanical standpoint, due to the considerable efforts exerted on the mobile rod whose diameter is, however, necessarily limited. In addition, the assembly of the pivoting lever inside the arms constituting the block, leads to the use of a rod for maintaining the return spring which is of reduced dimensions and length. It is thus observed that the mechanical stress of the return spring at the level of the pivoting lever may be at the origin of deformations and torsions on the pivot shaft and on the lever.

Finally, Patent Application FR-A-2 507 554 is known, which proposes to reduce the tendency of the wipers to be detached, without resorting to additional parts passing through the bodywork of the vehicle. To that end, the wiper arm is mounted fast with the drive shaft of the wiper, which shaft is mounted to move slidably along its longitudinal axis. The assembly of the wiper arm is such that its carrier shaft is mounted fast, with simple possibility of rotation about its axis, with a connection element embracing the drive shaft of the wiper, the carrier shaft consequently occupying a fixed position on the connection element. A return spring, interposed between the wiper arm and a fastening element, ensures return of the arm towards the windscreen by rotation about its bearer shaft. Slide of the drive shaft makes it possible to modify the position of the arm and consequently the lever arm of the system, as well as the tension of the spring which then develops a variable contact force, all the greater as the axis of rotation of the wiper arm is distant from the surface to be wiped and from the return axis of the spring. This system necessitates having to resort to an especially dimensioned drive shaft and employs numerous assembly parts which contribute to an overall fragility of said system. Furthermore, the assembly proposed does not allow considerable variations in the contact force and is not transposable on a conventional vehicle without prior modification.

The object of the present invention is therefore to propose a novel windshield wiper system overcoming the problems of functioning and of detachment of the wipers in the case of high speed of the vehicle, which does not present the drawbacks of the prior art devices, which is simple to implement and whose assembly is possible without modification of the vehicle.

Another object of the invention aims at producing a windshield wiper system in which the contact force of the wiper on the surface to be wiped is variable, continuously as the user wishes.

Another object of the invention is to propose a particularly robust windshield wiper system adapted to undergo, without damage and durably, an increase in the return force exerted by the spring for maintaining the wiper against the windscreen.

SUMMARY OF THE INVENTION

The object of the invention is attained thanks to a windshield wiper system with adjustable contact force comprising:

a wiper arm adapted to support a wiper and mounted fast with a shaft for driving the system by a connection assembly to which it is connected by a carrier shaft allowing rotation of the arm between at least one work position against the surface to be wiped and at least one position of disengagement, said arm furthermore being mounted with a possibility of translation with respect to the surface to be wiped, a means for elastic return of the wiper arm towards its work position, adapted to produce a contact force of the arm against the surface to be wiped, said means being interposed between the arm and the connection element in order to define a return axis, a means for controlling the contact force, characterized in that the carrier shaft is mounted to be freely displaceable on the connection element in a path along which it is permanently biased via the return means away from the return axis, so as to cause an increase in the contact force proportional to the distance away, the control means being constituted by a locking means opposing the away motion of the carrier shaft.

Various other characteristics will appear from the description made hereinbelow with reference to the accompanying drawing which show, by way of non-limiting examples, embodiments of the object of the invention.

BRIEF DESCRIPTION OF THE DRAWINGS

FIG. 3 shows a view in longitudinal section of the windshield wiper system, showing the latter in a position corresponding to a maximum contact force.

FIG. 4 is a plan view of the windshield wiper system.

DETAILED DESCRIPTION OF THE INVENTION

Figure 1:
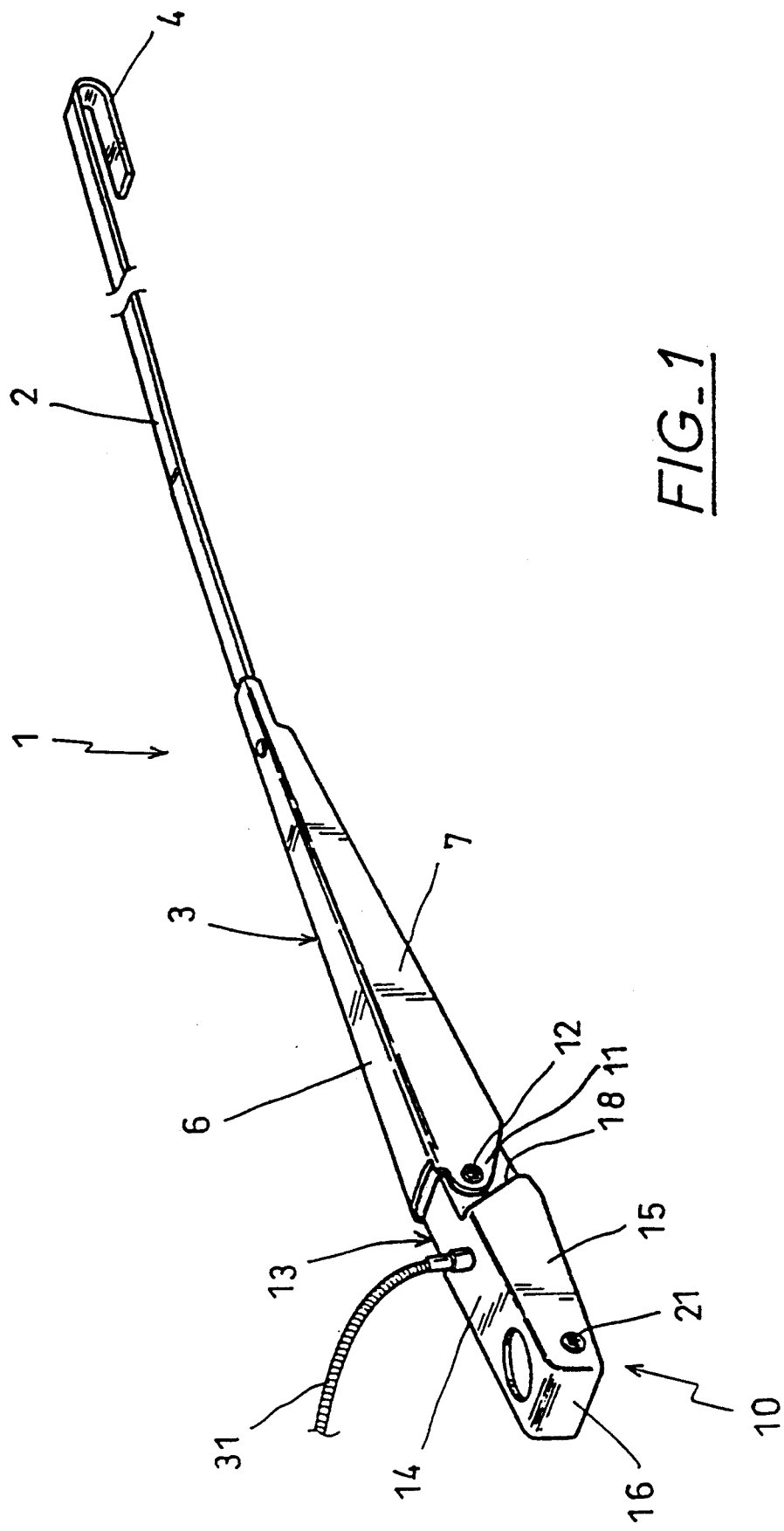
FIG. 1 shows a general view in perspective of a windshield wiper system according to the invention.
Figure 2:
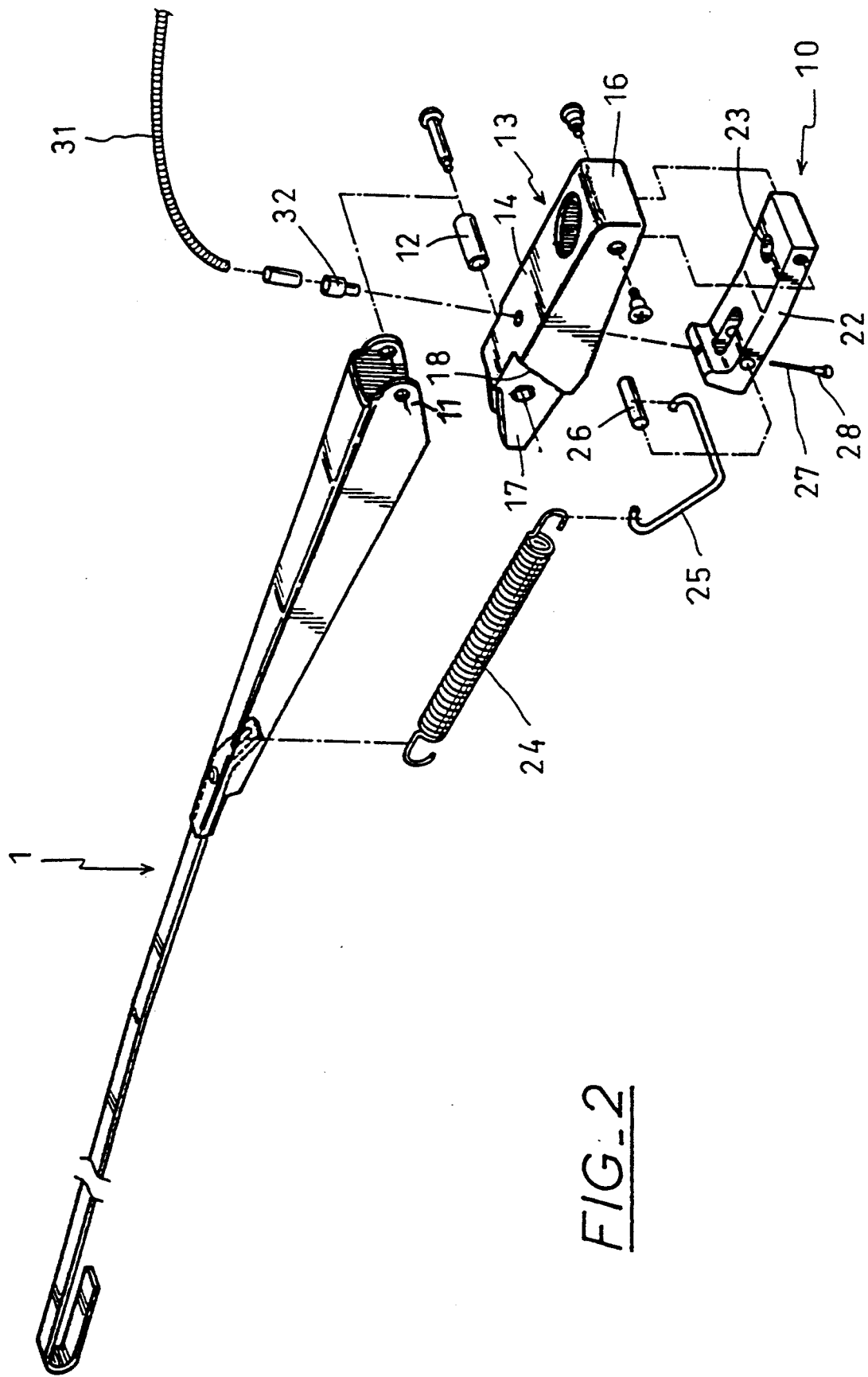
FIG. 2 shows an exploded view of a windshield wiper system, similar to the one shown in FIG. 1.

The windshield wiper system shown in FIG. 1 comprises a wiper arm 1, constituted by a support arm 2 and a head beam 3. The support arm 2 is generally constituted by a metal rod of solid section, presenting, at one end 4, a connecting device adapted to receive and retain a wiper (not shown in the Figure). In the example shown in FIGS. 1 and 2, the connecting device presents a curvature in which the elements for fastening the wiper may engage.

The opposite end 5 of the support arm 2 is intended to serve as element for fixation on the head beam 3 which, in the example shown, is in the form of a beam, preferably metallic, of transverse U-section defining a web 6 and two lateral sides 7. The end 5 is preferably fixed, by any known means, on the web 6, for example by welding or by riveting, the support arm 2 extending beyond the zone of fixation by a tongue 8 provided with a bore and extending inside the U-section defined by the head beam 3.

The lateral sides 7 define, at the end opposite the zone of fixation with the support arm 2, a pair of lugs 11 for fixation in which are symmetrically made two orifices intended to serve as seat for receiving a carrier shaft 12 constituting a connecting assembly, mobile and rotatable between the wiper arm and a connection assembly 10 with a drive shaft (not shown in the Figures) intended to ensure a reciprocating movement of the windshield wiper system.

In the example shown, the connection assembly 10 comprises a connecting block 22 and a lever 13 in the form of an elongated cover, of substantially U-transverse section, defining a central web 14 bordered by two lateral edges 15. The cover comprises, at one end, a terminal wall 16, solid or recessed and, at the other end, two spaced apart symmetrical arms 17 provided with orifices for receiving the carrier shaft 12, and intended to be inserted between the lugs 11 for fixation and inside the U-section of the support beam 3.

The arms 17 may of course be constituted by added parts, welded for example on the body of the cover, or may form integral part of the cover itself. The cover preferably presents, near the end for connection with the support beam 3, two shoulders 18 made for example in the lateral edges and the central web 14, intended to serve as bearing stop for the edges of the fixing lugs 11 during relative rotation of the arm 1 and of the lever 13 about their common axis 12.

The lever 13 is itself mounted to rotate freely and displaceable, preferably at the end opposite arms 17, by a shaft 21 parallel and of direction identical to the carrier shaft 12, on a connection block 22, fast with a drive shaft (not shown in the Figures) and intended to be angularly wedged in an orifice 23 made in the connection block 22 to give the system a reciprocating wiping movement.

The assembly thus produced constitutes a toggle joint formed by the wiper arm 1, on the one hand, and the lever 13, on the other hand, these two elements forming therebetween an angle which varies depending on the angular clearance of the articulation and allowing the carrier shaft 12 to move freely on the connection assembly 10.

The connection block 22 is advantageously in the form of a metallic piece, of substantially parallelepipedic shape, and comprising a point of fixation for an elastic return means whose function is to produce a contact force capable of maintaining the wiper in abutment against the surface to be wiped. Depending on the type of vehicle, the shape of the connection block 22 may vary and, in particular, the cover 13 may cover only partially the connection block 22, this latter even being able to traverse the terminal wall 16 partly or completely.

The elastic return means is preferably constituted by a tension spring 24 whose longitudinal axis x-x' extends in the plane of symmetry P of the wiper arm 1 and in the direction of the longitudinal axis of said arm. The spring 24 is fixed, by one end, in the orifice in the tongue 8 and, by the other end, directly or by means of an intermediate piece such as a hook 25, on the connection assembly 10 by a rod 26, for example. The spring 24 thus defines a return axis merged with its longitudinal axis x-x'.

Figure 5:
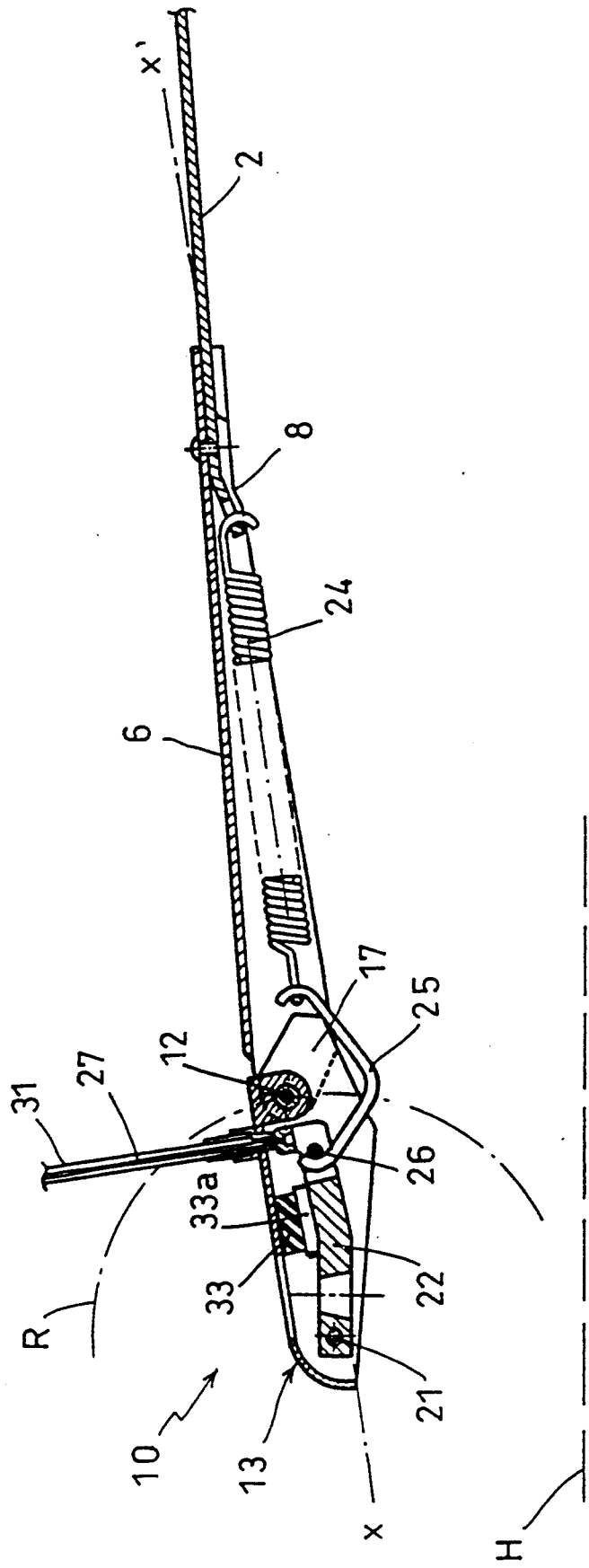
FIG. 5 shows a view, similar to FIG. 3, showing a windshield wiper system in a position where the contact force is minimum.

It is particularly advantageous if the connection block 22 forms an obtuse angle on its face directed towards the lever 13 or is incurved, in order that, with respect to a fictitious horizontal plane H, the axis 26 is further away than axis 21 from said plane, by a value for example of 8 mm. This arrangement facilitates the action of the spring 24 from or in the vicinity of its position of equilibrium (low or virtually zero return force) and prevents the arm from being stabilized in a position of equilibrium (FIG. 5).

Thanks to the assembly chosen and to the return force exerted by the draw spring 24 on the wiper arm 1, the toggle joint advantageously gives two freedoms of motion to the wiper arm 1, when the latter bears against the surface to be wiped, namely a rotation about the carrier axis 12 and a translation along circle R about axis 21 during rotation of the lever 13. The assembly proposed provokes, under the action of the spring 24, a permanent tendency to reduce the angular clearance of the toggle joint leading to defining a path away from the carrier shaft 12 with respect to the return axis x-x' or to the surface to be wiped. Such away motion provokes a variation in the tension of the spring 24 as a function of the path made by the carrier shaft 12 along the circle R, and is translated by an increase in the contact force of the arm 1 on the surface to be wiped which is proportional to the distance away. Inversely, the approach of the carrier shaft 12 provokes a reduction in the contact force. The mechanism involved is to approach the buckling of an elongated part, when the latter is subjected to a compression by its two ends, the point of buckling being here materialized in plane P, by a point located on axis 12.

In place of the tension spring 24, it is, of course, possible to use any equivalent elastic return means. Similarly, it is possible to use a complementary compression spring which may for example be mounted between the connection block 22 and the lever 13 or between the wiper arm 1 and a support element extending the connection block 22.

The means for controlling the angular clearance of the toggle joint, against the return force exerted by the elastic return means 24, is preferably constituted by a remote-control means comprising a traction cable 27, mounted and fixed by one end comprising a locking head 28 on the connection assembly 22 and, preferably, at the end opposite axis 21. The traction cable 27 traverses the lever 13, in the present case the central web 14 of the cover, and is connected, by its other end (not shown in the Figures), to a device for controlling the tension of the cable 27. Cable 27 is provided, in its part outside the lever 13, with a tensioning sheath 31, with helicoidal threads, for example, in abutment against a stop ring 32, itself in abutment by a shoulder against the outer face of the central core 14. The stop ring 32 may advantageously present a bent form to give a specific direction to the tensioning cable. The other end of the cable 27 is connected to a conventional device for tensioning a cable (not shown in the Figures), comprising, for example, a winding pulley.

It is obvious that other means may be used in place of the remote control device composed of a tensioning cable, such as a pusher or a piston. In the same way, it is possible to use a cable controlled by a manual device or by a device comprising an electric motor or an electro-magnet or even a remote-control.

FIG. 3 shows a work position of the windshield wiper system corresponding to a minimum angular clearance of the toggle joint and to a contact force which may be qualified as maximum. When the driver of a vehicle wishes to reduce the contact force of the wiper arm 1 on the surface to be wiped, he/she will then control the device for tensioning the cable 27 which, by increase of its tension and by reaction of the ring 32 on the lever 13, will cause pivoting of lever 13 about axis 21, in the direction of arrow $f_1$ causing rotation of the carrier shaft 12 along a portion of circle R. During this pivoting, the wiper arm 1 will undergo both a slight rotation about the carrier shaft 12 in a direction opposite arrow $f_1$ and also undergo a translation in the direction of arrow $f_1$ which will be translated, by bearing on the surface to be wiped, by an increase in the angular clearance angularly modifying the effort exerted by the spring 24 on the wiper arm 1 and being translated by a reduction in the contact force on the force (sic.) to be wiped.

FIG. 5 shows one of the extreme positions that the toggle joint according to the invention may attain and which corresponds to a virtually minimum value of the contact force exerted by the wiper arm 1 on the surface to be wiped, which position corresponds to a substantially maximum angular clearance of the toggle joint. When the driver wishes to increase the contact force of the system according to the invention, it suffices to relax the tension of the cable 27, the force of traction of the spring 24 naturally tending to return the toggle joint towards a reduced angular clearance, of which the extreme limit is determined by the abutment of the edges of the fixation lugs 11 against the shoulders 18.

It will therefore be understood that, in the position corresponding to the theoretical minimum contact force, the geometrical axis of shaft 12 may merge with the longitudinal axis x-x' of the spring 24, the toggle joint also being virtually in a position of equilibrium. In order to promote the return towards positions of the toggle joint corresponding to maximum or increased contact forces, it may be advantageous to dispose, between the connection block and the inner face of the central web 14, a rebound piece 33 (FIG. 5) made of an elastic material. This rebound piece 33 may advantageously be inserted in a maintaining piece or bearing two lateral support shoulders 33a (FIGS. 4 and 5), fast with the connection block 22 and performing a function of guiding and relieving of the shaft 21, during the displacement of the toggle. The connection block 22 will likewise advantageously be bent to allow the rod 26 to be mounted above the axis 21 with respect to a fictitious reference plane, in order to facilitate the return of the spring leading to a reduced angular clearance.

It is, of course, possible to eliminate the lever 13 and to mount the wiper arm 1 directly on the connection block 22. In that case, it is necessary to arrange at least one slot for slide in the mass of the connection block in which the carrier shaft 12 is mounted to move with possibility of slide. The slot may be curved and define a path, of circular type, identical, for example, to an arc of circle, with the same center as circle R for example. The slot may also be rectilinear and, advantageously, oblique, the longitudinal axis of the slot then defining an axis secant to the return axis x-x' and being oriented so that the moving away of the carrier shaft 12 with respect to axis x-x' is translated by an increase in the contact force of the wiper.

Figure 6:
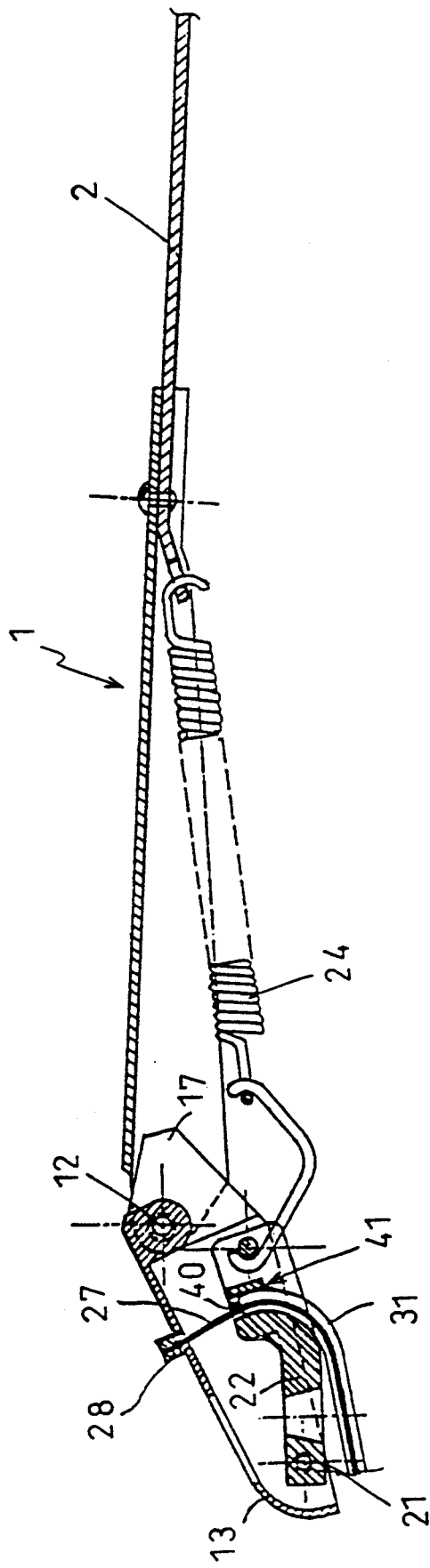
FIG. 6 shows a variant embodiment of the control means.

FIG. 6 illustrates another variant embodiment which differs from the preceding assemblies by a reverse arrangement of the means for controlling the angular clearance of the toggle joint. The cable 27 traverses the lever 13 and is maintained by tensioning in abutment against the upper face 14 of the lever by a locking head 28. The cable 27 penetrates inside the connection block 22 by means of a bore 40 and opens out beneath said block 22. The other end of the cable is connected to a conventional cable tensioning device. The tensioning sheath 31 is inserted in a cylindrical conduit 41 made in the connection block 22 and extending the bore 40 in the direction of the lower face of the connection block. The end of the sheath 31 is in abutment against an annular shoulder located between the bore 40 and the cylindrical conduit 41. Functioning of this variant is identical to the variants described previously. However, this variant presents the advantage of allowing a more careful presentation, insofar as cable 27 is virtually invisible from the outside. In addition, this variant releases the end of the connection block 22 on which is mounted the shaft 26 which may then be disposed nearer this end and near its upper limit, which allows a positioning of the carrier shaft 12 virtually on axis x-x'. This arrangement therefore increases the range of variation of the contact force to very low values.

The windshield wiper system according to the invention presents the advantage of proposing to a user a possibility of continuously adjusting the contact force of the wiper arm on the surface to be wiped and presents the additional advantage of being able to be fitted, without any modification, in place of the existing windshield wiper systems. In fact, the system according to the invention fits on conventional drive shafts, since the latter performs no particular role, apart from its conventional function of drive. In particular, it is adaptable to wiper shafts of which the arrival of water is effected through the drive shaft itself.

The windshield wiper system according to the invention also comprises a limited number of moving parts, allowing particularly easy manufacture for a low cost and leading to a proved robustness. Finally, the toggle joint renders possible particularly considerable variations in the contact force, which makes it possible to envisage multiple applications and in particular on vehicles presenting particularly large surfaces to be cleaned.

The system according to the invention also relieves, in its position or positions of minimum pressure, the rubbing part of the wipers, which leads to increasing the useful life of said elements.

The elements constituting the system according to the invention may be standardized, since, by simply adjusting the contact force of the wiper, it is possible to find, for each vehicle, the appropriate contact force with the aid of a simple manipulation.

The invention is not limited to the examples described and shown, as various modifications may be made without departing from the scope thereof.

POSSIBILITY OF INDUSTRIAL APPLICATION

The invention is preferably applicable in the domain of automobile construction as windshield wiper for private or professional transport vehicles.

We claim:
1. A windshield wiper system comprising:
   a wiper arm having first and second ends, said arm being adapted to support a windshield wiper at said first end;
   a connection assembly including an elongated lever member and a connection block, said lever member having first and second end portions, said connection block having means for fixedly securing said connection block with a drive shaft for oscillating said connection assembly;
   means for pivotally connecting the second end portion of said lever member to said connection block, said connecting means defining a pivot axis;
   means for pivotally attaching the second end of said wiper arm to the first end portion of said lever member, said attaching means including a carrier shaft that extends substantially parallel to said pivot axis, said wiper arm, lever member and attaching means constituting a toggle joint with said carrier shaft permitting relative articulation of said lever member and said wiper arm;
   biasing means interconnected between said wiper arm, intermediate said first and second ends thereof, and said connection block, said biasing means being adapted to produce a contact force of a windshield wiper attached to said wiper arm against a surface to be wiped; and means for adjusting the contact force produced by said biasing means, said adjusting means extending between said lever member and said connection block for controlling the movement of said lever member and said connection block relative to each other about said pivot axis.

2. The windshield wiper system of claim 1, wherein the second end of said wiper arm terminates in a pair of spaced lugs which extend about and are pivotally attached to, by said attaching means, the first end portion of said lever member.

3. The windshield wiper system of claim 2, wherein said lever member includes two lateral edges, each of said lateral edges defining a shoulder at the first end portion of said lever member, said shoulders being engageable by said lugs of said wiper arm to limit the movement of the toggle joint.

4. The windshield wiper system of claim 3, wherein said lever member is substantially U-shaped in transverse cross-section with said two lateral edges being interconnected by a central web, said connection block being received between said lateral edges such that the lever member acts as a protective cover for said connection block.

5. The windshield wiper system of claim 1, wherein said adjusting means acts against the force of said biasing means to prevent rotation of said lever member about said pivot axis.

6. The windshield wiper system of claim 5, wherein said biasing means comprises a tension spring.

7. The windshield wiper system of claim 5, wherein said adjusting means includes a cable unit having an inner cable and an outer sheath surrounding said cable, said cable unit being of finite length defining opposite ends, said cable having a respective end thereof fixed to said connection block at a location spaced from said pivot axis and said sheath having an end thereof abutting said lever member.

8. The windshield wiper system of claim 5, wherein said adjusting means includes a cable unit having an inner cable and an outer sheath surrounding said cable, said cable unit being of finite length defining opposite ends, said cable having an end thereof fixed to said lever member at a location spaced from said pivot axis and said sheath having an end thereof abutting said connection block.

9. The windshield wiper system of claim 1, wherein said connection assembly further includes elastic means positioned between said lever member and said connection block to prevent direct engagement between said lever member and said connection block at a location remote from said pivot axis.

* * * * *